United States Patent
Salerno

(10) Patent No.: US 7,376,485 B2
(45) Date of Patent: May 20, 2008

(54) METHOD OF REMOTELY PROGRAMMING AND UPDATING FOOD PRODUCT HOLDING APPARATUS USING HAND HELD COMPUTER

(76) Inventor: Mark Salerno, 13 Harmony Rd., Huntington, NY (US) 11743

( * ) Notice: Subject to any disclaimer, the term of this patent is extended or adjusted under 35 U.S.C. 154(b) by 778 days.

(21) Appl. No.: 10/478,813

(22) PCT Filed: May 23, 2002

(86) PCT No.: PCT/US02/16756

§ 371 (c)(1),
(2), (4) Date: Nov. 26, 2003

(87) PCT Pub. No.: WO02/097576

PCT Pub. Date: Dec. 5, 2002

(65) Prior Publication Data

US 2005/0027401 A1 Feb. 3, 2005

Related U.S. Application Data

(60) Provisional application No. 60/294,927, filed on May 31, 2001.

(51) Int. Cl.
*G06F 19/00* (2006.01)
*A47J 27/00* (2006.01)

(52) U.S. Cl. .......................... 700/211; 700/207; 99/325; 219/714

(58) Field of Classification Search ................ 700/207, 700/211; 99/325; 219/714
See application file for complete search history.

(56) References Cited

U.S. PATENT DOCUMENTS

| | | | |
|---|---|---|---|
| 4,812,963 A * | 3/1989 | Albrecht et al. | ................ 700/2 |
| 5,109,222 A | 4/1992 | Welty | |
| 5,710,712 A | 1/1998 | Labun | |
| 5,778,256 A | 7/1998 | Darbee | |
| 5,815,086 A | 9/1998 | Ivie et al. | |
| 5,875,430 A * | 2/1999 | Koether | .......................... 705/1 |
| 6,080,972 A * | 6/2000 | May | .......................... 219/494 |
| 6,249,710 B1 * | 6/2001 | Drucker et al. | ................ 700/15 |
| 6,813,575 B2 * | 11/2004 | Laflamme | .................... 99/325 |
| 6,837,148 B1 * | 1/2005 | Deschenes et al. | ........... 99/325 |

* cited by examiner

Primary Examiner—Ryan A. Jarrett
(74) Attorney, Agent, or Firm—Gerald T. Bodner

(57) ABSTRACT

A remotely programmable food product holding system includes a hand held computer (10) and a food product holding apparatus (12). The computer includes a processor (11), touch screen display (15), and a first communication interface (16). Data is entered into the hand held computer and transmitted to the food product holding apparatus. The holding apparatus includes a second communication interface, a timer system (18), and a temperature control system (20). The timer and temperature control systems are programmed by data transmitted from the hand held computer. A method of remotely programming a food product holding apparatus includes the steps of coupling a hand held computer to a food product holding apparatus, downloading data from the food product holding apparatus, comparing the downloaded data with a file stored in the computer, displaying differences found in the comparison, updating the downloaded data in accordance with the stored file, and uploading the updated data to the food product holding apparatus.

12 Claims, 4 Drawing Sheets

METHOD OF REMOTELY PROGRAMMING AND UPDATING FOOD PRODUCT HOLDING APPARATUS USING HAND HELD COMPUTER

CROSS-REFERENCE TO RELATED APPLICATIONS

This application claims the benefit of U.S. Provisional Patent Application No. 60/294,927 filed May 31, 2001, the disclosure of which is incorporated herein by reference.

BACKGROUND OF THE INVENTION

1. Field of the Invention

This invention relates generally to the programming of data necessary to hold and store food product in a commercial kitchen using a hand held terminal or hand held computer, and more specifically relates to programming product quality times and temperatures necessary to properly hold cooked product using a hand held terminal or hand held computer.

2. Description of the Prior Art

In most restaurants, food quality in commercial kitchens is a very high priority. The prepared food must be properly timed to insure proper food quality. Currently, there are many pans or trays of food that are being timed in kitchens. The hold times are preset for each timer in the timer system. Each pan location has a single button that sets the hold time for each product pan. All the preset hold times must be checked for proper settings. Currently, the preset hold times are programmed from the keyboard of the timer system. Therefore, it would be advantageous to have a hand held portable device that could be preprogrammed with hold times for each pan location, then connected to the timer system to check and set the proper preset hold times.

In restaurants today when new menu items are added, the hold times must be programmed into the hold timer system. Currently, each location that has the new menu item must be programmed using the keyboard of the timer system. Therefore, it would be advantageous to have a hand held portable device that could be preprogrammed with hold times for each pan location, then connected to the timer system to check and set the proper preset hold times.

In most restaurant chains, an area manager must check the hold times in the holding cabinets at many locations. This is time consuming and can lead to errors. Therefore, it would be advantageous to have a hand held portable device that could be connected to the holding cabinet that checks and sets the preset hold times.

In most restaurants, the prepared food must be properly held at safe temperatures to insure that food born illness is avoided. Food holding cabinets exist today with temperature controls that are set from the front panel. Users at the control panel may incorrectly set these set temperatures. When several holding cabinets are in a kitchen, it becomes difficult to check and set the set points of each of the temperature controllers. Therefore, it would be advantageous to have a hand held portable device that could be connected to the holding cabinet to check the standard temperature set points and reset them, if necessary.

In most restaurant chains, an area manager must check the Temperature set points in the holding cabinets at many locations. This is time consuming and can lead to errors. Therefore, it would be advantageous to have a hand held portable device that could be connected to the holding cabinet that checks and sets the holding temperatures.

In most restaurant chains, the corporation sets the temperature and hold times of new menu items. Currently, written communications are used to distribute this information. Using this information, the restaurant manager must program the hold temperatures and hold times using the keyboards of the holding cabinets and hold timer system. Therefore, it would be advantageous to have the information transmitted in an electronic file that can be read by a hand held portable device, which could be connected to the holding cabinet that sets the holding temperatures and hold time. The disclosure of U.S. patent application Ser. No. 09/692,578 filed Oct. 19, 2000 is incorporated herein by reference.

In most restaurants, the checking of proper settings of temperature set points in temperature control is done through a keyboard. Therefore, it would be advantageous to have the set points and timers checked via wired or wireless devices.

OBJECTS AND SUMMARY OF THE INVENTION

It is an object of the present invention to provide a hand held computer device that connects to a food timer system, which sends a preset hold time to the food timer system.

It is another object of the present invention to provide a hand held computer device that connects to a food holding system, which sends temperature set points to the food holding system.

It is yet another object of the present invention to provide software that resides in the hand held computer device, which allows the user to enter the preset hold time to the food timer system.

It is a further object of the present invention to provide software that resides in the hand held computer device, which allows the user to enter the temperature set points to the food holding system.

It is an object of the present invention to provide software that resides in the hand held computer device, which allows the user to receive temperature set points via digital data in electronic form.

It is another object of the present invention to provide software that resides in the hand held computer device, which allows the user to store many different hold times and set points in a named file for later retrieval.

It is yet another object of the present invention to provide a hand held computer to send the data via wired means to the hold timers or the temperature controls.

It is a further object of the present invention to provide a hand held computer to send the data via infrared wireless means to the hold timers or the temperature controls.

It is an object of the present invention to provide a hand held computer to send the data via radio frequency (RF) wireless means to the hold timers or the temperature controls.

A remotely programmable food product holding system formed in accordance with one form of the present invention, which incorporates some of the preferred features, includes a hand held computer and at least one food product holding apparatus. The hand held computer includes a processor coupled to a display, at least one entry device, and a first communication interface. The entry device is selectable by a user to enter data into the hand held computer and transmit the entered data to the food product holding apparatus via the first communication interface.

The food product holding apparatus includes a second communication interface, a timer system, and a temperature control system. The second communication interface communicatively couples the product holding apparatus and the hand held computer. The timer and temperature control systems are operatively coupled to the second communication interface and are programmed in accordance with data transmitted from the hand held computer.

A method of remotely programming a food product holding apparatus in accordance with another form of the present invention, which incorporates some of the preferred features, includes the steps of coupling a hand held computer communicatively to a food product holding apparatus, downloading data from the food product holding apparatus, and comparing the downloaded data with the stored file. The method also includes displaying a quantity of exceptions, updating the downloaded data in accordance with the stored file, and uploading the updated data to the food product holding apparatus. The exceptions are representative of differences between the downloaded data and the stored file.

These and other objects, features, and advantages of this invention will become apparent from the following detailed description of illustrative embodiments thereof, which is to be read in connection with the accompanying drawing.

DETAILED DESCRIPTION OF THE PREFERRED EMBODIMENTS

Top Level Description

Figure 1:
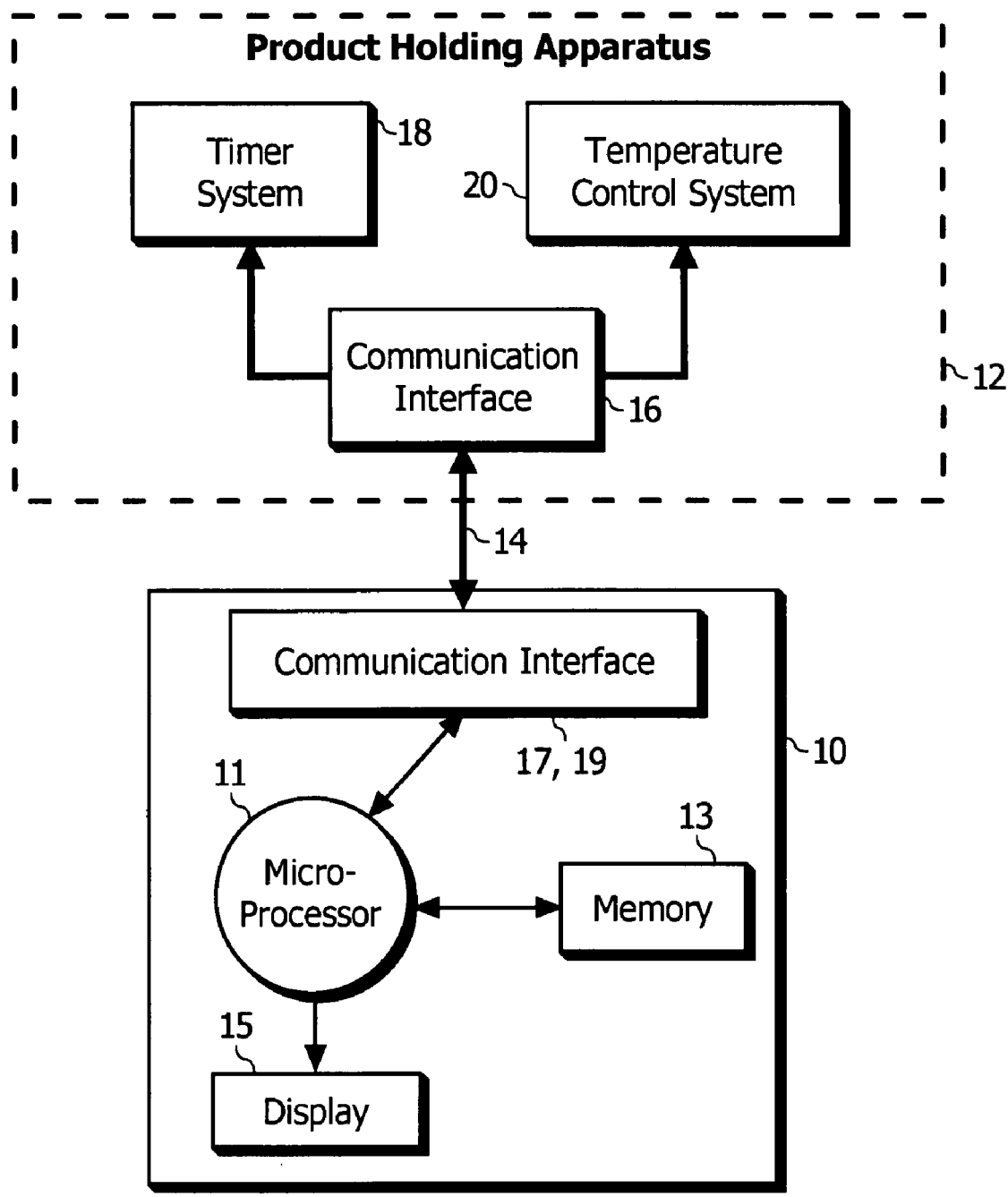
FIG. 1 is a top-level block diagram of the apparatus for programming a product holding system formed in accordance with the present invention and applied to a restaurant.

FIG. 1 shows a block diagram of an apparatus for programming a product holding system formed in accordance with the present invention. The apparatus is preferably applied to a restaurant serving prepared food.

The product hold programming apparatus preferably includes a hand held computer 10, such as a Palm Pilot™ with a stylus, graphic touch screen display, integrated infrared (IR) port, and a serial port. Using the one or more entry devices on the hand held computer 10, such as a button or stylus and graphic touch screen, the user preferably enters data, such as product name, hold time, cook time, and hold temperature associated with a food product into the hand held computer device 10.

The user then preferably connects the device 10 to a product holding apparatus 12 via a serial hardwire, wireless infrared, or RF communication link 14. A compatible receiver or communication interface 16, located in the product holding system 12, preferably decodes the data.

The data is preferably transferred to a timer system 18 and a temperature control system 20 within the apparatus 12. The hold times and temperatures are then set in accordance with the data transferred from the hand held computer 10.

Figure 2:
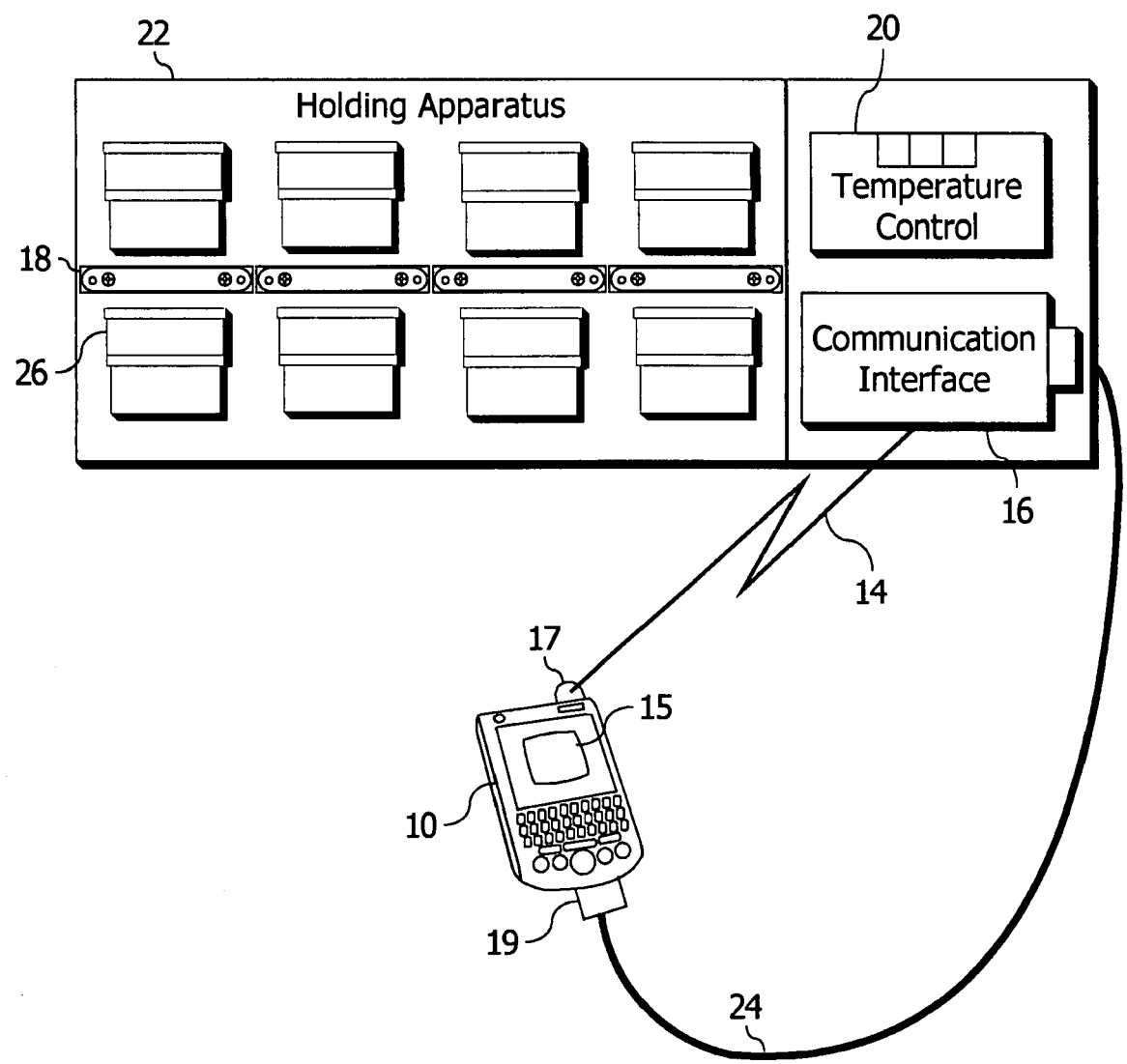
FIG. 2 is a front font view of a hand held apparatus and the product holding system formed in accordance with the preset invention.

FIG. 2 shows a pictorial representation of the apparatus for programming a product holding system. The product hold system programming apparatus preferably includes the hand held computer 10, which preferably includes the stylus, graphic touch screen display 15, integrated IR port 17, and serial port 19.

As shown in FIG. 1, the hand held computer 10 preferably also includes a processor or microcontroller 11 with software stored in memory 13. The memory 13 is preferably coupled to the processor 11 and directs the operation of the processor 11.

Using the stylus and graphic touch screen display 15, the user preferably enters data, such as product name, hold time, cook time, and hold temperature associated with a food product into the hand held computer device 10. The hand held computer 10 is preferably connected to the holding apparatus 22 via a serial data cable 24, or an IR or RF communication link 14.

The holding apparatus 22 preferably includes a timer system 18 and a temperature control system 20. A communication interface or receiver 16 preferably receives the data from the hand held computer 10 and controls the setting of the times and temperatures in the timer system 18 and temperature control system. Pans of food 26 are shown being heated.

Figure 3:
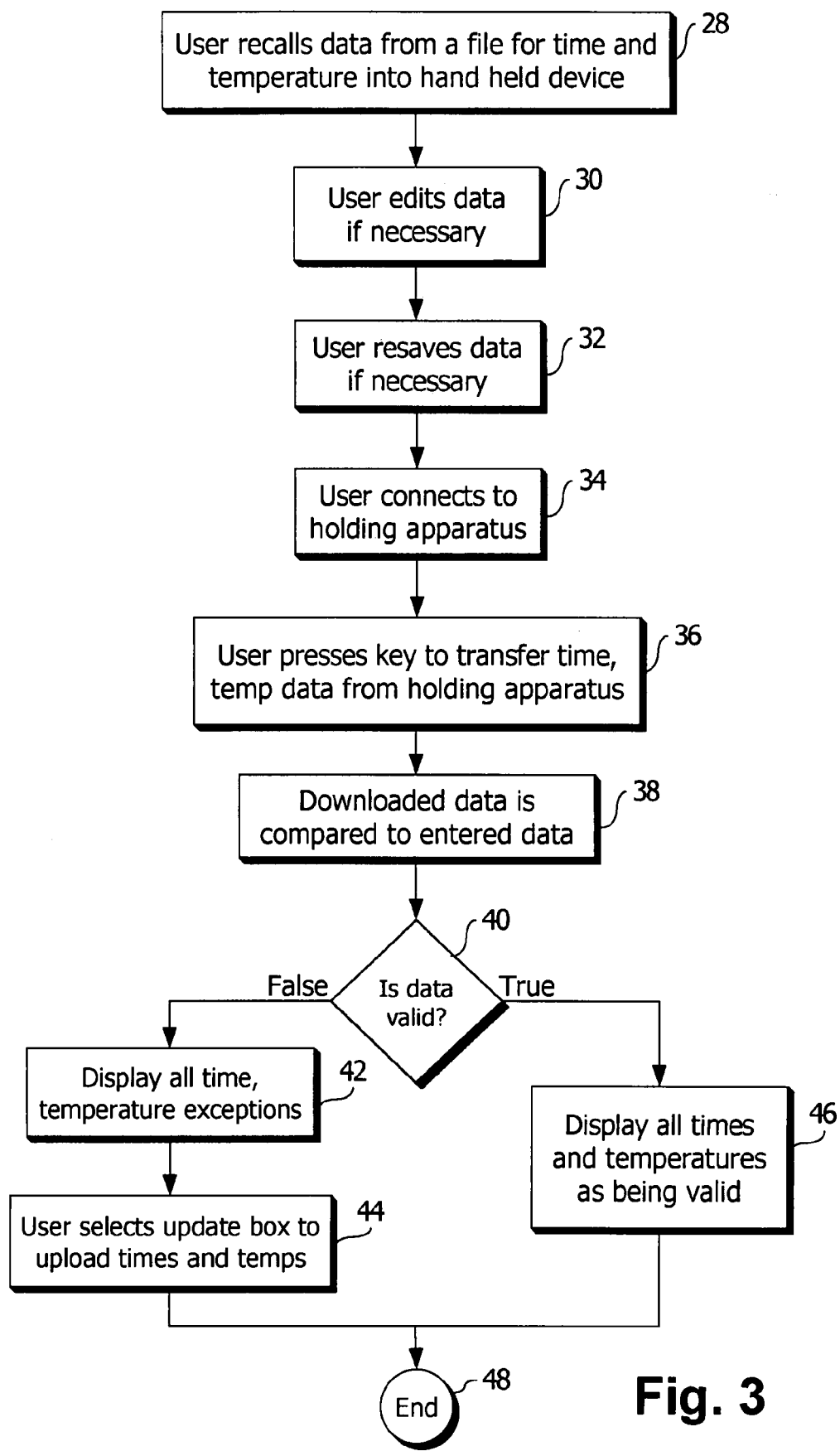
FIG. 3 is a flow chart summarizing the steps of programming the product holding system formed in accordance with the present invention and applied to a restaurant.

FIG. 3 shows a flow chart of a preferred operating method for the hand held computer. The user preferably recalls data from a file stored in memory that includes product name, hold time, cook time, and temperature for each product being held in step 28. Using the stylus and touch screen, the user preferably edits the data in step 30, if necessary. The user may then re-save the data in the same or a different file in step 32.

The user preferably connects the hand held computer to the holding apparatus by physically connecting the data cable or pointing the infrared or radio frequency transmitter in the hand held computer toward the holding apparatus in step 34. The user preferably selects a check data key on the hand held computer to receive the data from the product holding apparatus in step 36.

The received data is then preferably compared to data entered on and/or stored in the hand held computer in step 38. A decision is preferably made in step 40, which enables the user to verify the validity of the data entered on the hand held computer.

A dialog box preferably displays the exceptions, which represent differences between the downloaded data and the data from the hand held computer in step 42. The user then preferably selects appropriate buttons in a dialog box to either exit or update the data in the product holding apparatus in step 44 by uploading the data to the product holding apparatus. If the received data matches the data from the hand held computer in step 40, the dialog box preferably displays all time and temperatures as being valid in step 46, and the program ends in step 48.

Figure 4:
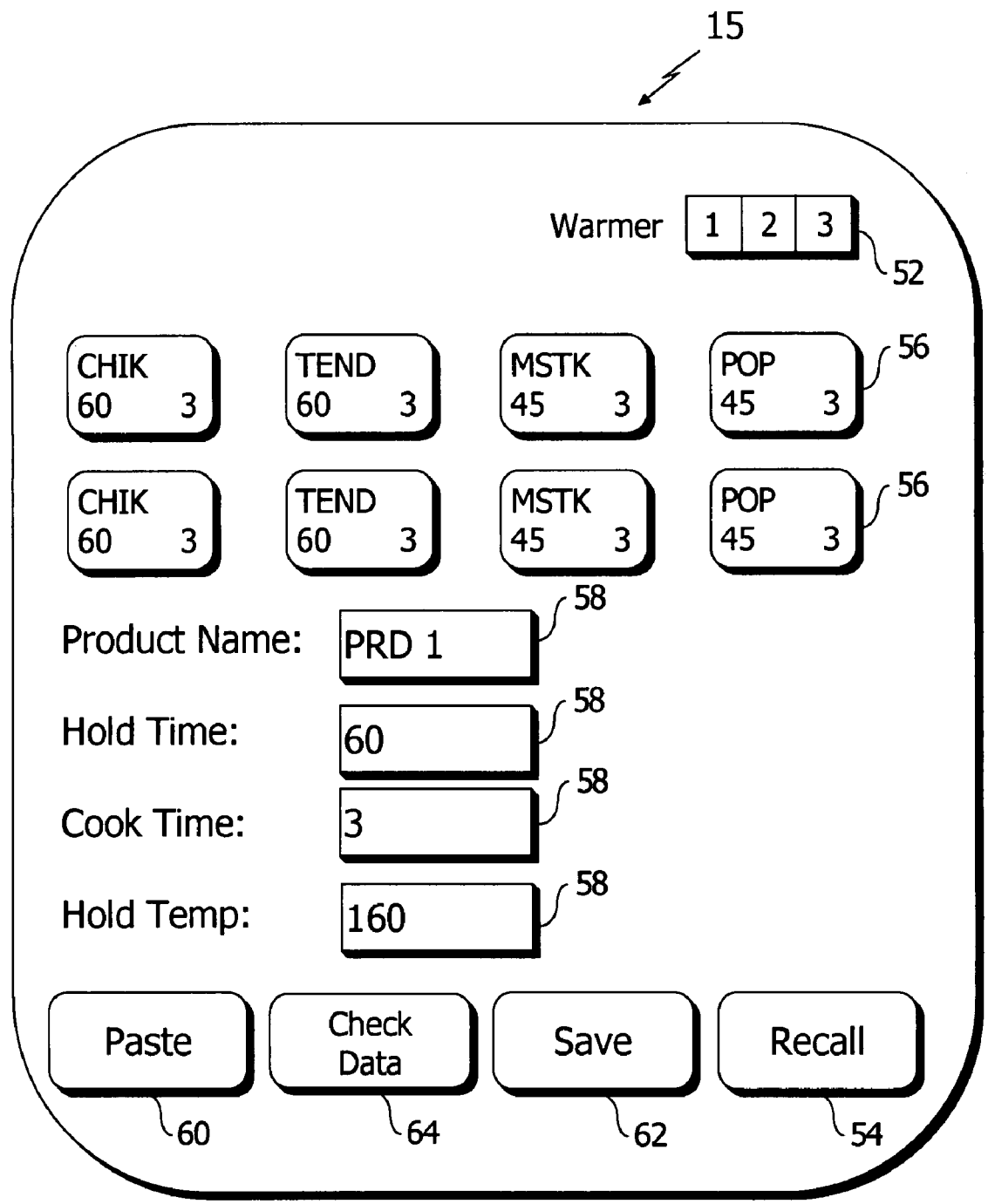
FIG. 4 is an illustration of the operator interface of the hand held device, which allows data to be entered.

FIG. 4 shows a preferred embodiment of the hand held computer display screen 15. The touch screen display 15 is preferably used to enter and edit the data. The screen preferably includes a warmer select field 52, which enables the user to select one of three product-holding apparatuses for programming.

If the user selects a recall box 54, a dialog box preferably shows each of the stored file names. The user then preferably selects a file name to recall the data saved in the file.

If the user selects a product select field 56, the data corresponding to the selected product is preferably displayed in edit fields 58. The user then preferably highlights the data in one of the edit fields 58 and modifies the highlighted data, if necessary.

The user preferably selects a paste box 60, which causes the paste box 60 to be highlighted. If the user selects one of the product select fields 56, data from the edit fields 58 is preferably copied to the product select field 56 chosen by the user.

The user then preferably selects a save box 62, which causes a dialog box to be displayed that requests a file name.

The user then preferably enters the desired file name and selects an OK box with the stylus to store the data under the chosen file name.

The user then preferably connects the hand held computer to the product hold apparatus or aims the IR or RF transmitter in the communication interface towards the product hold apparatus and selects a check data box 64. The hand held computer then preferably downloads data from the product hold apparatus. The data is compared and if the data does not match, a dialog box displays the data that does not match or exceptions, an exit box, and an update box. If the user selects the update box, the data is preferably transmitted to the product hold apparatus. If the data matches, then a dialog box is displayed on the hand held computer indicating that all hold times and temperatures match and are valid.

Additional Embodiments

Although the product holding apparatus is shown as three separate systems, a single device may include the IR or RF receiver, timer system, and temperature control system while remaining within the scope of the present invention.

Although illustrative embodiments of the present invention have been described herein with reference to the accompanying drawing, it is to be understood that the invention is not limited to those precise embodiments, and that various other changes and modifications may be erected therein by one skilled in the art without departing from the scope of spirit of the invention.

What is claimed is:

1. A method of remotely programming a food product holding apparatus, the method comprising the steps of:
   recalling a stored file from memory in a hand held computer;
   coupling the hand held computer communicatively to a food product holding apparatus;
   downloading data from the food product holding apparatus;
   comparing the downloaded data with the stored file;
   displaying a quantity of exceptions, the exceptions being representative of differences between the downloaded data and the stored file;
   updating the downloaded data in accordance with the stored file; and
   uploading the updated data to the food product holding apparatus.

2. A method of remotely programming a food product holding apparatus as defined by claim 1, further comprising the steps of
   editing the stored file; and
   storing the edited file.

3. A method of remotely programming a food product holding apparatus as defined by claim 1, further comprising the step of displaying an indication that the downloaded data is substantially equivalent to the stored file in response to there being no exceptions.

4. A method of remotely programming a food product holding apparatus as defined by claim 1, further comprising the step of displaying at least one of a warmer select field, product select field, edit field, paste box, check data box, save box, and recall box on the hand held computer.

5. A method of remotely programming a food product holding apparatus as defined by claim 4, further comprising the step of selecting one of a plurality of food product holding apparatuses for programming in response to the warmer select field being selected.

6. A method of remotely programming a food product holding apparatus as defined by claim 4, further comprising the step of selecting one of a plurality of food products for editing in response to the product select field being selected.

7. A method of remotely programming a food product holding apparatus as defined by claim 4, further comprising the step of editing data associated with a selected food product in response to selecting the edit field.

8. A method of remotely programming a food product holding apparatus as defined by claim 4, further comprising the step of copying data associated with a selected edit field to a selected product select field in response to the paste box being selected.

9. A method of remotely programming a food product holding apparatus as defined by claim 4, wherein the steps of downloading data from the food product holding apparatus and comparing the downloaded data with the stored file are performed in response to the check data box being selected, the method further comprising the step of displaying an exit box and an update box, and wherein the steps of updating the downloaded data in accordance with the stored file and uploading the updated data to the food product holding apparatus are performed in response to the update box being selected.

10. A method of remotely programming a food product holding apparatus as defined by claim 4, further comprising the step of displaying a dialog box requesting a file name for saving data entered in the hand held computer in response to the save box being selected.

11. A method of remotely programming a food product holding apparatus as defined by claim 4, wherein the step of recalling a stored file from memory in a hand held computer further includes the step of displaying a dialog box including file names of data saved in the hand held computer in response to selecting the recall box.

12. A method of remotely programming a food product holding apparatus as defined by claim 1, wherein the data includes at least one of a product name, hold time, cook time, and temperature associated with a food product.

* * * * *